US012694107B1

(12) United States Patent
Raziel et al.

(10) Patent No.: US 12,694,107 B1
(45) Date of Patent: Jul. 28, 2026

(54) METADATA-BASED DATA OBJECT DETECTION AND CLASSIFICATION IN CLOUD COMPUTING ENVIRONMENTS FOR DATA SECURITY POSTURE MANAGEMENT

(71) Applicant: Wiz, Inc., New York, NY (US)

(72) Inventors: Alma Raziel, Tel Aviv-Jaffa (IL); Elad Gabay, Tel Aviv (IL); Liron Levin, Kfar Saba (IL); Daniel Lazarev, Tel Aviv (IL); Erez Harush, Tel Aviv (IL); George Pisha, Giv'atayim (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/562,220

(22) Filed: Mar. 10, 2026

(51) Int. Cl.
    *G06F 21/55* (2013.01)
    *G06F 21/57* (2013.01)
(52) U.S. Cl.
    CPC .......... *G06F 21/554* (2013.01); *G06F 21/577* (2013.01); *G06F 21/552* (2013.01)
(58) Field of Classification Search
    CPC ..... G06F 21/554; G06F 21/577; G06F 21/552
    See application file for complete search history.

(56) References Cited

U.S. PATENT DOCUMENTS 11,876,813 B2 1/2024 Ithal et al.
2024/0232418 A1* 7/2024 Karthik ............... G06F 21/6227

2025/0202926 A1 6/2025 Chandrabose et al.
2025/0335583 A1* 10/2025 Varanasi ............... G06F 21/554
2025/0335585 A1* 10/2025 Hanna ................... G06F 21/554
2025/0371136 A1* 12/2025 Weizman ............. G06F 21/552
2025/0373613 A1* 12/2025 Dalla ................... H04L 63/101
2026/0006047 A1* 1/2026 Ahmad ................. G06F 21/552

FOREIGN PATENT DOCUMENTS

CN 120104624 B 6/2025

* cited by examiner

*Primary Examiner* — Cheng-Feng Huang
(74) *Attorney, Agent, or Firm* — M&B IP Analysts, LLC

(57) ABSTRACT

A system and method for classifying data objects for data security posture management (DSPM) in a cloud computing environment based on metadata are presented. The method includes detecting data objects in data sources of the cloud computing environment, wherein each data object in the data objects comprises metadata; generating metadata-derived features from the metadata, wherein the metadata-derived features include hierarchy and path features; clustering the data objects into data clusters based on a similarity determination applied to the metadata-derived features; generating, for a first data cluster of the data clusters, an aggregated cluster representation and a corresponding prompt based on metadata associated with data objects in the first data cluster; generating a cluster classification for the first data cluster based on a result of processing the corresponding prompt with a language model; and generating data findings based on the cluster classification and classification results.

19 Claims, 7 Drawing Sheets

100

200

START

Detect a Plurality of Data Objects . S210

Obtain Metadata for Each of the Detected Plurality of Data Objects. S220

Cluster the Detected Plurality of Data Objects Into Groups Based on the Obtained Metadata. S230

Generate a Classification For Each of the Data Groupings. S240

Generate a Data Finding Based on Each Generated Classification. S250

END

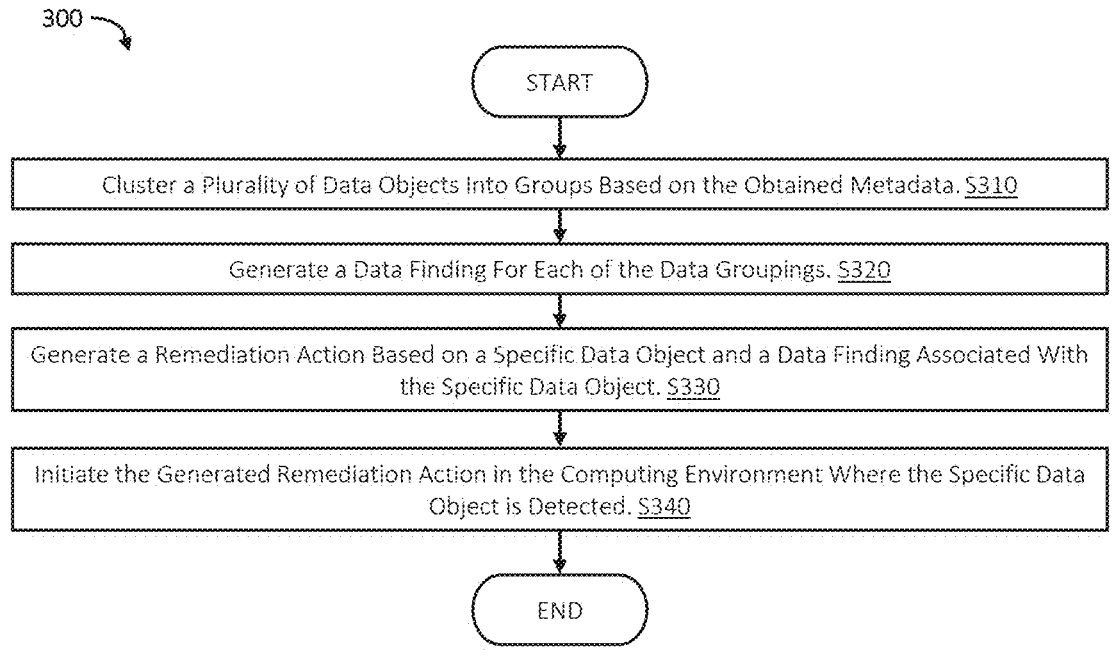

300 ⬎

START

Cluster a Plurality of Data Objects Into Groups Based on the Obtained Metadata. S310

Generate a Data Finding For Each of the Data Groupings. S320

Generate a Remediation Action Based on a Specific Data Object and a Data Finding Associated With the Specific Data Object. S330

Initiate the Generated Remediation Action in the Computing Environment Where the Specific Data Object is Detected. S340

END

FIGURE 3

METADATA-BASED DATA OBJECT DETECTION AND CLASSIFICATION IN CLOUD COMPUTING ENVIRONMENTS FOR DATA SECURITY POSTURE MANAGEMENT

TECHNICAL FIELD

This disclosure relates, generally, to the field of computing, particularly, to computer security and cloud computing, and more particularly, to data discovery, classification, and control application in data security posture management (DSPM) environments using metadata-based analysis of data objects across cloud data sources.

BACKGROUND

Data security posture management (DSPM) systems are increasingly used to discover, classify, and govern data stored across cloud computing environments. Such environments commonly include heterogeneous data sources, such as object storage buckets, databases, backup repositories, log stores, and other managed services distributed across multiple accounts, regions, and cloud service providers. Effective DSPM typically depends on identifying data objects of interest and applying appropriate controls, policies, and remediation actions.

Many existing data discovery and classification approaches rely primarily on the inspection of payload content. For example, conventional techniques frequently use pattern matching and content scanning to identify predefined data formats, such as email addresses, payment card numbers, national identifiers, or other structured data patterns. While content-based approaches can be effective for detecting certain known patterns, they may require access to sensitive payload content, which can be undesirable from a security, privacy, or compliance perspective. Moreover, content scanning may be computationally expensive at scale and may be difficult to perform consistently across heterogeneous cloud services and storage modalities.

Additionally, content-based pattern matching often provides limited dataset-level understanding and may not adapt well to environment-specific organization, naming conventions, or storage practices. Cloud environments frequently include customer-specific structures, such as hierarchical namespaces, file paths, object keys, and operational artifacts (e.g., configuration state files, model artifacts, backup dumps, logs) that may not be reliably detected using predefined content patterns alone. As a result, conventional techniques may fail to identify important non-standard artifacts, may generate excessive false positives or false negatives, and may provide insufficient context for selecting appropriate controls or remediation actions.

Thus, there exists a need for an implementation of improved techniques for detecting and classifying data objects in cloud computing environments that reduce or avoid reliance on payload content access, provide environment-specific understanding of datasets, and improve the ability of DSPM systems to generate actionable findings and apply controls across diverse cloud data sources.

Therefore, it would be advantageous to provide an efficient solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key nor critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having hardware, firmware, firmware executing on hardware, software, software executing on hardware, or any combination of them installed on the system that, in operation, cause or causes the system to perform the actions. One or more computer programs can be configured to perform particular operations or actions by virtue of including instructions that, when executed by a data processing apparatus, cause the apparatus to perform the actions.

In one general aspect, the method may include detecting a plurality of data objects in one or more data sources of the cloud computing environment, where each data object in the plurality of data objects may include metadata. The method may also include generating metadata-derived features from the metadata, where the metadata-derived features include hierarchy and path features derived from at least one of object keys and file paths; clustering the plurality of data objects into a plurality of data clusters based on a similarity determination applied to the metadata-derived features; generating, for a first data cluster of the plurality of data clusters, an aggregated cluster representation and a corresponding prompt based on metadata associated with data objects in the first data cluster; generating a cluster classification for the first data cluster based on a result of processing the corresponding prompt with a language model; generating one or more data findings based on at least one of the cluster classification and a plurality of classification results. Other embodiments of this aspect include corresponding computer systems, apparatus, and computer programs recorded on one or more computer storage devices, each configured to perform the actions of the methods.

Implementations may include one or more of the following features. The method may include: generating a recommended remediation action based on a data finding; and initiating the recommended remediation action in the cloud computing environment by invoking one or more provider interfaces.

The method where the invoked one or more provider interfaces modify at least one of access controls, encryption settings, tags, and storage configuration associated with a data object implicated by the data finding; monitoring drift based on changes in at least one of metadata distributions, cluster composition, and rule-based match distributions; and responsive to detecting drift, triggering at least one of re-characterizing one or more clusters using the language model and re-synthesizing at least one customer-specific classification rule; selecting, based on at least one of the cluster classification, a confidence score, and a policy constraint, a candidate subset of data objects for optional content scanning; and performing content scanning only on the selected candidate subset to generate confirmation outputs that refine at least one data finding.

The method where the metadata, for each data object in the plurality of data objects, is obtained via one or more provider interfaces that provide object properties without accessing payload content of the data object; generating, based on the cluster classification, one or more customer-specific classification rules configured to classify additional data objects using the metadata without accessing payload content; validating the one or more customer-specific clas- sification rules against a metadata corpus or inventory; and storing versioned rules based on results of the validating; applying at least one stored versioned rule to metadata-derived features of newly detected data objects to generate the plurality of classification results. Implementations of the described techniques may include hardware, a method or process, or a computer tangible medium.

In one general aspect, the system may include one or more processors configured to: detect a plurality of data objects in one or more data sources of the cloud computing environ- ment, where each data object in the plurality of data objects may include metadata; generate metadata-derived features from the metadata, where the metadata-derived features include hierarchy and path features derived from at least one of object keys and file paths; cluster the plurality of data objects into a plurality of data clusters based on a similarity determination applied to the metadata-derived features; gen- erate, for a first data cluster of the plurality of data clusters, an aggregated cluster representation and a corresponding prompt based on metadata associated with data objects in the first data cluster; a cluster classification for the first data cluster based on a result of processing the corresponding prompt with a language model; generate one or more data findings based on at least one of the cluster classification and a plurality of classification results. Other embodiments of this aspect include corresponding computer systems, appa- ratus, and computer programs recorded on one or more computer storage devices, each configured to perform the actions of the methods.

Implementations may include one or more of the follow- ing features. The system where the one or more processors are further configured to: generate a recommended reme- diation action based on a data finding; and initiate the recommended remediation action in the cloud computing environment by invoking one or more provider interfaces.

The system where the invoked one or more provider interfaces modify at least one of access controls, encryption settings, tags, and storage configuration associated with a data object implicated by the data finding.

The system where the one or more processors are further configured to: monitor drift based on changes in at least one of metadata distributions, cluster composition, and rule-based match distributions; and responsive to detecting drift, trigger at least one of re-characterizing one or more clusters using the language model and re-synthesizing at least one customer-specific classification rule.

The system where the one or more processors are further configured to: select, based on at least one of the cluster classification, a confidence score, and a policy constraint, a candidate subset of data objects for optional content scan- ning; and perform content scanning only on the selected candidate subset to generate confirmation outputs that refine at least one data finding.

The system where the metadata, for each data object in the plurality of data objects, is obtained via one or more provider interfaces that provide object properties without accessing payload content of the data object.

The system where the one or more processors are further configured to: generate, based on the cluster classification, one or more customer-specific classification rules configured to classify additional data objects using the metadata without accessing payload content.

The system where the one or more processors are further configured to: validate the one or more customer-specific classification rules against a metadata corpus or inventory; and store versioned rules based on results of the validating.

The system where the one or more processors are further configured to: apply at least one stored versioned rule to metadata-derived features of newly detected data objects to generate the plurality of classification results. Implementa- tions of the described techniques may include hardware, a method or process, or a computer tangible medium.

In one general aspect, non-transitory computer-readable medium may include one or more instructions that, when executed by one or more processors of a device, cause the device to: detect a plurality of data objects in one or more data sources of the cloud computing environment, where each data object in the plurality of data objects may include metadata; generate metadata-derived features from the metadata, where the metadata-derived features include hier- archy and path features derived from at least one of object keys and file paths; cluster the plurality of data objects into a plurality of data clusters based on a similarity determina- tion applied to the metadata-derived features; generate, for a first data cluster of the plurality of data clusters, an aggregated cluster representation and a corresponding prompt based on metadata associated with data objects in the first data cluster; generate a cluster classification for the first data cluster based on a result of processing the correspond- ing prompt with a language model; and generate one or more data findings based on at least one of the cluster classifica- tion and a plurality of classification results. Other embodi- ments of this aspect include corresponding computer sys- tems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be appar- ent from the following detailed description taken in con- junction with the accompanying drawings. In the drawings:

FIG. 3 illustrates an example operational flowchart of a process for initiating remediation actions based on data findings generated from metadata-based classification, according to at least one embodiment.

DETAILED DESCRIPTION

Figure 1:
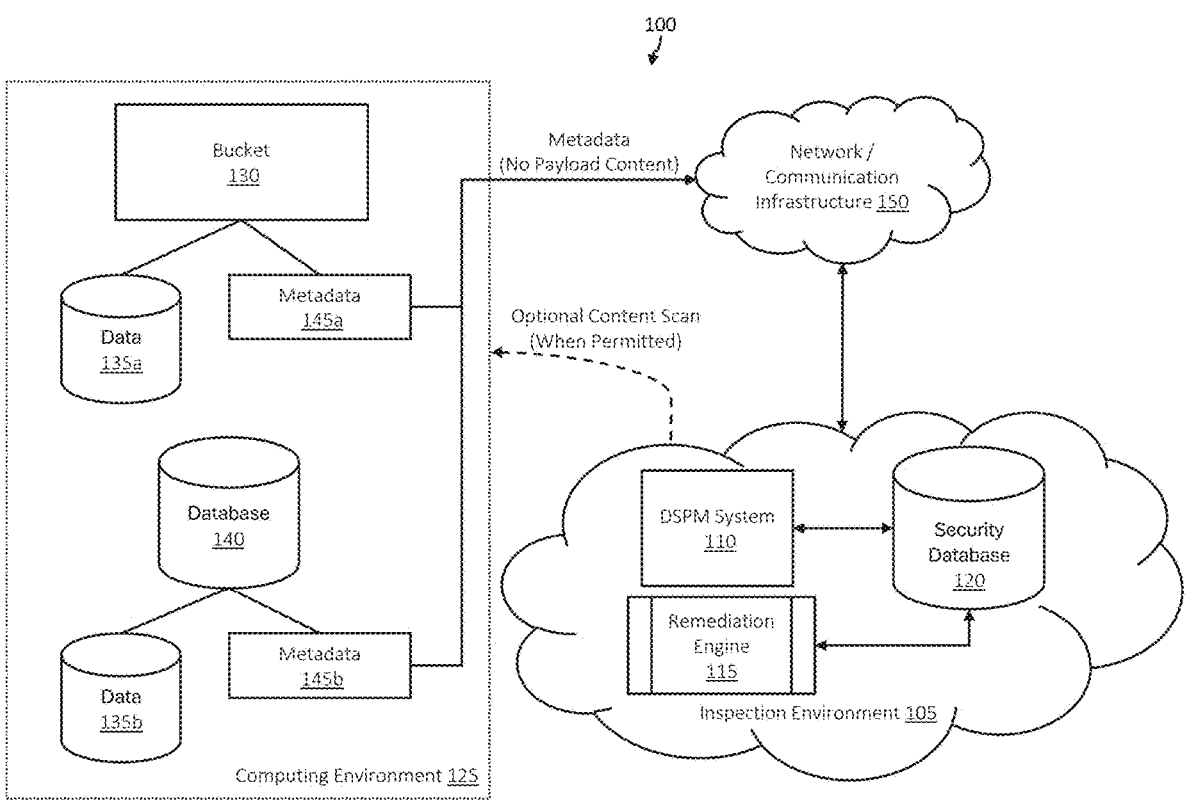
FIG. 1 illustrates an example computing environment utilized to describe various embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

As used herein, the following terms have the meanings set forth below, unless the context clearly indicates otherwise. The definitions provided herein are intended to clarify the disclosed embodiments and do not limit the scope of the invention unless expressly stated. To the extent a term is not expressly defined herein, the term is intended to have its ordinary and customary meaning to a person having ordinary skill in the art (PHOSITA) at the time of filing.

"Data source" refers to a service or system that stores, references, or exposes data objects, including object storage services (e.g., buckets), databases, data lakes, file systems, backup repositories, log stores, virtual machine disks, snapshots, catalogs, and/or similar storage or data management services.

"Data object" refers to any unit of stored or addressable data in a data source, including, without limitation, a file, blob, object, document, table, view, export, snapshot, backup artifact, log artifact, model artifact, configuration artifact, or other stored entity addressable by an identifier.

"Payload content" or "content" refers to the substantive contents of a data object (e.g., file bytes, object body, table cell values) as distinct from metadata. Accessing payload content includes reading, scanning, parsing, or otherwise inspecting the substantive data of the data object.

"Metadata" refers to information associated with a data object that can be obtained without accessing payload content. Metadata may include object identifiers, names, file paths or object keys, hierarchical path segments, directory depth, timestamps, size, storage properties, tags/labels, ownership attributes, access control attributes, encryption indicators, versioning indicators, content-type indicators, checksums/hashes (when available without payload access), and other non-payload properties.

"Object identifier" refers to any identifier usable to reference or locate a data object, including a URI, object key, file path, table identifier, database identifier, bucket/container identifier, resource name, or other canonical reference.

"Hierarchy" or "namespace" refers to a representation of relationships among data objects based on naming structure, location structure, or other organization. For object storage, a hierarchy may be derived from object keys and delimiters (e.g., "/") and represented as a prefix tree or trie. For databases, a hierarchy may be derived from schemas, table namespaces, and/or backup/log naming conventions.

"Hierarchy features" or "path features" refer to features derived from object identifiers and/or hierarchies, including shared prefix length, token overlap of path segments, directory depth, sibling/ancestor relationships, extension patterns, and other path-based indicators.

"Feature extraction" or "normalization" refers to processing performed on metadata to create a consistent representation and/or feature set usable for similarity determination, clustering, classification, rule generation, and/or rule application, including tokenization, parsing, normalization of formats, and derivation of hierarchy/path features.

"Similarity determination" refers to a process for determining similarity between data objects and/or groups of data objects based on metadata-derived features. Similarity may be computed using one or more scores, thresholds, distance measures, predicates, or other criteria, and may be based on a weighted combination of features.

"Cluster" or "data cluster" or "data grouping" refers to a group of data objects determined to be similar based on metadata-derived features. A cluster may correspond to a set of objects sharing hierarchy/path characteristics (e.g., common prefixes) and/or other metadata patterns.

"Cluster assignment" refers to an association between a data object and a cluster identifier indicating membership in a cluster.

"Cluster summary" or "aggregated cluster representation" refers to a representation of a cluster derived from aggregated metadata associated with member data objects. A cluster summary may include representative object identifiers, common path tokens, naming patterns, summary statistics of metadata fields, access control patterns, and other cluster-level indicators.

"Machine learning (ML) model" refers to a model configured to generate an output based on an input, including supervised models, unsupervised models, heuristic models, and language models. An ML model may be trained, fine-tuned, prompted, and/or otherwise configured to produce classifications, attributes, confidence values, or other outputs.

"Language model (LM)" refers to a machine learning model configured to process natural language or token sequences. A language model may be used to characterize clusters based on prompts or model inputs generated from metadata and cluster summaries. In at least one embodiment, an LM includes (or is) a large language model (LLM).

"Prompt" or "model input" refers to an input to an ML model derived from metadata and/or a cluster summary, such as a structured prompt, template, token sequence, or other encoded representation.

"Cluster classification" refers to a classification output associated with a cluster, indicating a data type, dataset purpose, sensitivity category, control category, or other characterization. A cluster classification may include a label and optionally a confidence score and/or supporting attributes.

"Classification result" refers to a classification output associated with a data object and/or cluster produced by applying rules and/or models to metadata-derived features.

"Customer-specific classification rule" refers to a rule generated based on metadata patterns observed in a particular customer environment and/or based on a cluster classification, and configured to classify data objects based on metadata without requiring payload content access. A rule may be expressed as a predicate, pattern, regular expression, path-prefix rule, token constraint, policy-as-code rule, lightweight classifier, or other rule form.

"Customer environment" refers to a computing environment associated with a customer and including one or more cloud accounts, projects, subscriptions, tenants, regions, networks, resource groups, and/or data sources in which data objects are stored and managed, and in which metadata is obtained and analyzed for generating classifications, rules, and data findings.

"Rule synthesis" refers to the generation of one or more candidate rules based on cluster classifications and/or cluster summaries.

"Rule validation" refers to the evaluation of candidate rules against a metadata corpus/inventory to determine whether the rules satisfy one or more acceptance criteria. Rule validation may produce validation metrics and may result in an approved rule set.

"Rule versioning" refers to associating rules with versions (e.g., version identifiers, timestamps, deployment states) such that specific rule versions can be stored, retrieved, audited, and applied over time.

"Rule store" refers to a repository configured to store rules, rule versions, and optionally associated validation metrics, policy mappings, or other rule-related metadata.

"Continuous classification" refers to the ongoing application of rules and/or models to metadata associated with newly detected or changed data objects, including periodic scans, event-driven updates, and/or incremental processing.

"Metadata corpus/inventory" refers to a collection of metadata records associated with a set of data objects, which may be used for clustering, classification, validation, auditing, and/or drift detection. The metadata corpus/inventory may be maintained without accessing payload content.

"Data finding" or "finding" refers to a generated output that associates a classification with one or more data objects and/or clusters, and may include supporting metadata-derived evidence, confidence, timestamps (e.g., first seen/last seen), status, and recommended controls or actions.

"Gating controller" or "candidate subset selection" refers to logic configured to select a subset of data objects for additional processing (e.g., optional content scanning) based on metadata-derived outputs, confidence values, policies, and/or risk indicators.

"Optional content scan" or "optional confirmation" refers to payload-based scanning or inspection performed only when permitted and typically only on a gated candidate subset. Optional content scanning may be used to confirm or refine a metadata-based classification and/or adjust confidence.

"Remediation action" or "control action" refers to an action initiated or recommended based on a data finding, including modifying access controls, applying encryption settings, tagging/labeling objects, quarantining or relocating objects, generating alerts/tickets, and initiating automated workflows.

"Policy mapping" refers to associations between classifications/findings and one or more controls, remediation actions, priority levels, or workflow selections.

"Drift monitoring" refers to monitoring for changes in metadata patterns, cluster composition, rule performance, or environmental organization that may trigger re-characterization, re-synthesis, and/or rule updates.

"Re-characterization" refers to re-executing cluster characterization (e.g., via a language model) based on updated cluster summaries and/or updated metadata.

"Re-synthesis" refers to re-generating candidate rules based on updated classifications, updated metadata patterns, or drift signals.

The method and system detect and classify data objects in one or more cloud computing environments by obtaining and analyzing metadata associated with the data objects without accessing payload content, thereby reducing exposure to sensitive data while enabling scalable data discovery for data security posture management (DSPM). Additionally, the method and system can cluster data objects into data clusters based on similarity of metadata-derived features, including hierarchy and path features derived from bucket namespaces and/or database file paths, thereby enabling dataset-level understanding and environment-specific grouping beyond predefined content patterns.

Moreover, the method and system can characterize metadata-derived data clusters using a machine learning model, including a language model (LM), by generating a prompt or model input from aggregated cluster metadata and processing the prompt to generate a cluster classification, thereby enabling automated inference of dataset purpose and category from customer-specific naming and organization. Furthermore, the method and system can generate customer-specific classification rules, including novel classification rules, based on cluster classifications, and validate, version, and store the rules for continuous application to newly detected data objects using metadata features, thereby enabling adaptive, environment-specific classification that evolves with changes in the customer environment.

Also, the method and system can perform hybrid gating that selects a candidate subset of data objects for optional content scanning based on metadata-derived outputs and policy constraints, thereby minimizing payload access while enabling selective confirmation and refinement of metadata-based findings. In at least one embodiment, the method and system can generate data findings that include representative object identifiers (e.g., file paths or object keys), status, and time-based attributes, such as first-seen and last-seen indicators, and support serialized export (e.g., JSON), thereby enabling actionable reporting, auditing, and downstream control selection and remediation workflows in DSPM environments.

The disclosed embodiments are operable within a variety of computing architectures and communication environments and are not limited to any particular hardware, software, or network configuration discussed herein. The embodiments may be implemented across heterogeneous environments, including on-premises systems, cloud-based infrastructures, hybrid deployments, edge-based systems, and distributed computing environments, and may operate across multiple cloud providers, accounts, regions, and data source types.

The disclosed method is not a mental process and cannot be performed entirely in the human mind. Rather, the method involves technical operations that are executed within a computing environment and are tied to specific technological implementations. For example, the method includes: (i) detecting data objects in cloud data sources, such as object storage buckets and databases; (ii) obtaining and normalizing metadata associated with the data objects via provider interfaces without accessing payload content; (iii) generating metadata-derived features, including hierarchy and path features derived from object keys and file paths; (iv) clustering data objects into data clusters based on similarity determination and thresholding using metadata-derived features; (v) generating aggregated cluster representations and model inputs; (vi) processing the model inputs using a machine learning model, including a language model, to generate cluster classifications; (vii) synthesizing, validating, versioning, storing, and continuously applying customer-specific classification rules to newly detected objects based on metadata features; (viii) generating data findings based on metadata-derived classifications with optional confirmation via gated content scanning when permitted; and (ix) outputting recommended actions and/or initiating remediation actions in a cloud computing environment based on the data findings.

The operation and effectiveness of the disclosed system and method depend on a variety of technical factors, including, without limitation, the availability and structure of provider-exposed metadata, heterogeneity of metadata schemas across cloud services, organization of object keys and hierarchy structures, scale and churn of cloud inventories, computing resource constraints associated with metadata collection and clustering, selection and parameterization of similarity determination and thresholding, and configuration of model prompts and rule validation criteria. The method may dynamically modify classification workflows, rule synthesis, gating selection for optional content scanning, and recommended control selection based on observed metadata distributions, cluster composition changes, and drift signals. Such dynamic modification requires automated processing at machine scale and is not practically performable by a human operator without the use of computing systems.

Although a human operator may review findings, configure policies, or tune thresholds, execution of metadata acquisition, feature generation, clustering, model-based characterization, rule synthesis and validation, continuous classification of newly detected objects, and optional gated content scanning remains rooted in automated processing performed by computing systems. In particular, at runtime, the operational steps involved in enumerating large inventories of data objects, computing similarity across metadata-derived features, forming and updating clusters, generating and interpreting model inputs, versioning and applying rules, and producing findings with time-based attributes (e.g., first-seen/last-seen) are performed autonomously by the system without requiring human intervention at that time.

Accordingly, the disclosed embodiments are directed to a practical application of computer technology to solve a specific technical problem in the field of data security posture management for cloud environments. In particular, the disclosed embodiments improve data detection and classification coverage without requiring payload content access, improve environment-specific understanding through cluster-based characterization and customer-specific rule generation, reduce exposure to sensitive data by selectively gating optional content scanning, and improve consistency and scalability of control selection and remediation workflows across heterogeneous cloud data sources, all of which are necessarily rooted in computing technology.

FIG. 1 illustrates an example operating environment 100 for detecting and classifying data objects in a cloud computing environment based on metadata, and for generating data findings and initiating remediation actions, utilized to describe the various disclosed embodiments that may be implemented.

The operating environment 100 illustrated in FIG. 1 includes a data security posture management (DSPM) system 110 (hereinafter referred to as "system 110"), a security database 120, and a remediation engine 115, deployed within an inspection environment 105, and one or more data sources deployed within a computing environment 125, such as a bucket 130 and a database 140, communicatively coupled via a network or communication infrastructure 150.

System 110 is configured to discover data objects in one or more computing environments, obtain metadata associated with the data objects, classify data objects and/or groups of data objects based on the metadata, generate data findings, and initiate or recommend remediation and/or control actions.

In at least one embodiment, system 110 is configured to detect a plurality of data objects in computing environment 125 and to obtain metadata associated with the data objects without obtaining payload content of the data objects. For example, bucket 130 may expose metadata 145*a* and database 140 may expose metadata 145*b*, whereby metadata includes one or more object properties, such as object identifiers, names, file paths or object keys, hierarchical path segments, timestamps, sizes, storage properties, tags or labels, access control attributes, and/or other non-payload indicators. In at least one embodiment, system 110 obtains metadata 145*a*, 145*b* via one or more provider APIs, inventory interfaces, event interfaces, or other metadata-access mechanisms that do not require reading file contents or other payload content.

In at least one embodiment, system 110 is further configured to analyze the obtained metadata to classify data objects and to generate one or more data findings. For example, system 110 may cluster data objects based on similarity of metadata-derived features (e.g., path prefixes, hierarchical depth, tokenized names, timestamps, sizes, access control attributes) and may generate a classification for a group or cluster of data objects based on aggregated metadata associated with the group. System 110 may store cluster identifiers, metadata-derived features, classifications, confidence values, and/or findings in security database 120 for reporting, auditing, historical tracking, and/or downstream control application.

In at least one embodiment, computing environment 125 is a set of computing resources in which data objects may be stored and accessed, including public cloud infrastructure, private cloud infrastructure, on-premises infrastructure, edge resources, or combinations thereof. In at least one embodiment, computing environment 125 corresponds to a customer cloud computing environment including one or more cloud accounts, projects, subscriptions, tenants, regions, networks, or resource groups in which data objects are stored. Bucket 130 may include an object store or other storage service configured to store a plurality of data objects 135*a*. Database 140 may include a managed database service and/or database system configured to store a plurality of data objects 135*b*, such as tables, files, exports, snapshots, backups, logs, or other database-associated artifacts.

In at least one embodiment, inspection environment 105 is a computing environment in which system 110 performs analysis, classification, and/or control selection, and in which findings, rules, and related outputs may be stored. In at least one embodiment, inspection environment 105 is a cloud computing environment (distinct from computing environment 125) (not shown). The cloud computing environment may be implemented using public cloud infrastructure, private cloud infrastructure, on-premises computing resources, edge computing resources, or combinations thereof. The cloud computing environment may include, for example, a cloud provider environment (e.g., Google® Cloud Platform [GCP] environment) or similar platforms.

In at least one embodiment, communications between computing environment 125 and inspection environment 105 include transmission of metadata (no payload content), as illustrated by the metadata flow via network or communication infrastructure 150. By limiting communications to metadata, system 110 may reduce exposure to sensitive data contents while enabling environment-specific classification and dataset-level understanding based on metadata and hierarchy signals.

In at least one embodiment, system 110 supports an optional content scan when permitted. The optional content scan may be performed for a subset of data objects selected based on metadata-derived classification results, such that payload access is selectively invoked for confirmation and/or refinement rather than universally applied across all data objects. In at least one embodiment, results of the optional content scan are used to update a classification, augment a finding, and/or increase a confidence value, and may be stored in security database 120.

In at least one embodiment, remediation engine 115 is configured to receive one or more data findings and to initiate one or more remediation actions in response. Example remediation actions include, without limitation, modifying access control settings, applying encryption or storage configuration changes, tagging or labeling data objects, quarantining or relocating data objects, generating alerts or tickets, and/or initiating automated workflows in computing environment 125. Remediation engine 115 may obtain policies, control mappings, and/or historical remediation information from security database 120, and may record remediation status and results in security database 120. In at least one or more embodiments, remediation engine 115 may include (or is) one or more policy evaluation components and one or more automation components configured to select and initiate remediation actions via one or more provider interfaces.

In at least one embodiment, security database 120 is a repository configured to store findings, classifications, cluster information, rule versions, remediation outcomes, timestamps, status values, and other security-related outputs. The security database 120 may be implemented using one or more databases, key-value stores, indexes, file systems, or other data storage mechanisms. The security database 120 may be realized using any suitable storage architecture. In at least one embodiment, the security database 120 is implemented as cloud-based storage, including object-storage services, managed database services, distributed file systems, or virtualized storage volumes provided by a cloud infrastructure.

Network or communication infrastructure 150 provides communication pathways that enable data exchange between computing environment 125 and inspection environment 105. Communication infrastructure 150 may include one or more networks, buses, gateways, communication links, or interconnects, and may support distributed, remote, or cross-cloud deployment of the illustrated components. The illustrated connections represent logical associations and are not intended to limit physical deployment configurations.

It will be appreciated that the diagram of FIG. 1 is provided for purposes of illustration and is not intended to limit the disclosed embodiments to the specific architecture, arrangement of components, or configuration shown therein. Additionally, fewer, or alternative components may be included, and the illustrated components may be combined, separated, or implemented in different forms without departing from the scope of the present disclosure. Additionally, the illustrated components may represent logical associations rather than physical network links, and the functionality described with respect to each component may be distributed across multiple computing resources.

Figure 2:
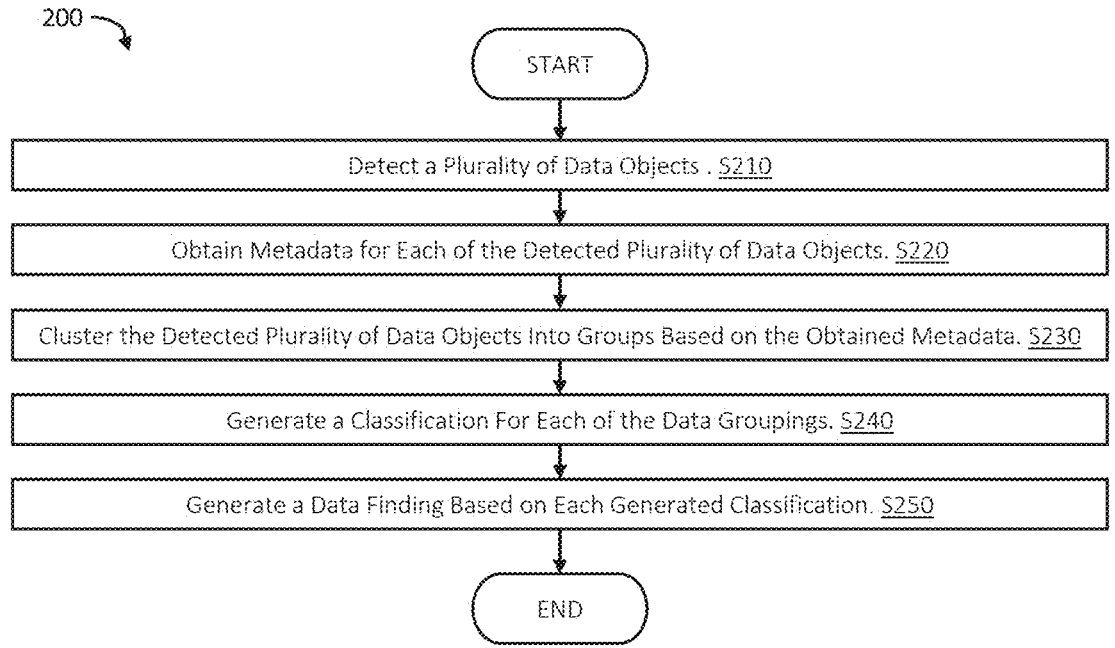
FIG. 2 illustrates an example operational flowchart of a process for classifying data objects based on metadata, according to at least one embodiment.

FIG. 2 is an operational flowchart diagram illustrating a method 200 (also referred to as "process 200") for classifying data objects based on metadata in a cloud computing environment and for generating one or more data findings based on the metadata-based classification, according to at least one embodiment. In at least one embodiment, the method 200 may be performed by a system, such as the data security posture management (DSPM) system 110 shown in FIGS. 1 and 4. The method 200 is discussed with reference to the elements shown in FIG. 1.

At S210, a plurality of data objects is detected. In at least one embodiment, detecting the plurality of data objects includes discovering, enumerating, or otherwise identifying data objects stored in one or more data sources within a computing environment (e.g., computing environment 125), such as a bucket 130 and/or a database 140. The detected data objects may include, without limitation, files, blobs, objects, tables, exports, snapshots, backups, log artifacts, model artifacts, configuration artifacts, or other stored units addressable by a cloud provider interface. In at least one embodiment, system 110 detects the data objects across multiple cloud platforms, multiple accounts, multiple regions, and/or multiple data repositories associated with a customer environment 125.

At S220, metadata is obtained for each of the detected plurality of data objects. In at least one embodiment, the metadata is obtained via one or more provider interfaces (e.g., APIs, inventory listings, catalog services, metadata endpoints, event streams, or file system interfaces) configured to return object properties without returning payload content of the data objects. In at least one embodiment, obtaining metadata includes extracting the metadata from one or more provider interfaces without accessing payload content. The obtained metadata may include, by way of example and not limitation, object identifiers, names, file paths or object keys, hierarchical path segments, directory depth, timestamps, size, storage properties, tags or labels, ownership attributes, access control attributes, encryption indicators, versioning indicators, content-type indicators, and/or other non-payload properties. In at least one embodiment, system 110 normalizes the obtained metadata into a common representation for use across heterogeneous sources.

At S230, the detected plurality of data objects are clustered into groups based on the obtained metadata. In at least one embodiment, clustering includes computing similarity between pairs of data objects and assigning the data objects to one or more data groupings (also referred to as "clusters") based on the similarity. Similarity may be determined using one or more metadata-derived features, such as shared file path prefixes, overlap of tokenized path segments, directory depth proximity, naming conventions, extension or suffix patterns, timestamp distributions, size distributions, storage location proximity, tag similarity, and/or access control similarity. In at least one embodiment, file paths are used as primary clustering signals, such that clusters correspond to groups of data objects associated with a common hierarchy region of the file path. In at least one embodiment, system 110 performs clustering in an incremental manner by updating cluster assignments as additional data objects are detected or metadata changes are observed.

At S240, a classification is generated for each of the data groupings. In at least one embodiment, system 110 generates, for a given cluster, an aggregated cluster representation based on metadata of data objects within the cluster, such as representative object identifiers, common path tokens, naming patterns, and summary statistics of one or more metadata fields. System 110 may process the aggregated cluster representation using a machine learning model to generate a cluster classification indicative of a data type, dataset role, sensitivity category, control category, or other characterization. In at least one embodiment, the machine learning model includes a language model (LM), and system 110 generates a prompt or other model input based on the aggregated cluster representation, and processes the prompt using the LM to obtain the cluster classification. In at least one embodiment, system 110 additionally determines a confidence score and/or supporting attributes associated with the cluster classification. In at least one embodiment, system 110 generates a customer-specific classification rule based on the cluster classification, whereby the rule is configured to classify additional data objects based on metadata without accessing payload content.

At S250, a data finding is generated based on each generated classification. In at least one embodiment, a data finding includes an association between a classification and one or more data objects and/or a cluster, and may further include supporting evidence derived from metadata, a confidence score, a time of detection, and/or recommended controls. The data finding may identify affected locations (e.g., buckets, prefixes, databases, schemas), impacted objects, and/or an inferred dataset purpose (e.g., model artifacts, state artifacts, backup artifacts, log artifacts). In at least one embodiment, the data finding is stored in a security database (e.g., security database 120) and is made available for reporting, alerting, and/or downstream control selection. In at least one embodiment, the data finding is used to select a subset of data objects for optional content scanning when permitted, thereby reducing payload access while enabling confirmation or refinement of metadata-based classification.

Although FIG. 2 shows example blocks of the method 200, in some implementations, process 200 may include additional blocks, fewer blocks, different blocks, or differently arranged blocks than those depicted in FIG. 2. Additionally, or alternatively, two or more of the blocks of process 200 may be performed in parallel. For example, obtaining metadata at S220 may be performed concurrently for data objects across different sources, clustering at S230 may be performed continuously or periodically, and classification at S240 may be performed for newly formed or updated clusters while other clusters remain unchanged.

FIG. 3 is an operational flowchart diagram illustrating a method 300 (also referred to as "process 300") for initiating remediation actions based on data findings generated from metadata-based classification of data objects, according to at least one embodiment. In at least one embodiment, the method 300 may be performed by a system, such as the data security posture management (DSPM) system 110 and/or remediation engine 115 shown in FIGS. 1 and 4. The method 300 is discussed with reference to the elements shown in FIGS. 1 and 2.

At S310, a plurality of data objects are clustered into groups based on obtained metadata. In at least one embodiment, system 110 obtains metadata for the plurality of data objects from one or more data sources (e.g., bucket 130 and/or database 140) without accessing payload content of the data objects, and determines similarity of the data objects using metadata-derived features, such as file paths or object keys, hierarchical path segments, tokenized names, timestamps, sizes, tags, and/or access control attributes. System 110 assigns the data objects to data groupings (clusters) based on the determined similarity, whereby each data grouping corresponds to a set of data objects sharing one or more metadata patterns and/or hierarchy characteristics.

At S320, a data finding is generated for each of the data groupings. In at least one embodiment, system 110 generates, for a given data grouping, a classification based on aggregated metadata associated with data objects of the grouping, and generates a data finding based on the classification. The data finding may include, without limitation, an identifier of the grouping, identifiers of affected data objects, an inferred category or dataset purpose, a confidence score, and supporting evidence derived from metadata (e.g., representative file paths or object keys). In at least one embodiment, the data finding is stored in a security database (e.g., security database 120) for reporting, auditing, and/or downstream enforcement.

At S330, a remediation action is generated based on a specific data object and a data finding associated with the specific data object. In at least one embodiment, generating the remediation action is performed via a remediation engine (e.g., remediation engine 115). In at least one embodiment, generating the remediation action includes selecting one of a plurality of remediation actions according to the classification, confidence, and/or policy mappings associated with the data finding, and further according to attributes of the specific data object (e.g., its location, access control state, tags, encryption indicators, ownership attributes, business context). Example remediation actions include modifying access control policies or permissions, restricting public access, applying encryption settings, tagging or labeling the data object, quarantining or relocating the data object, generating an alert or ticket, and/or initiating an automated workflow. In at least one embodiment, remediation engine 115 references security database 120 to retrieve applicable control policies, mappings between classifications and controls, historical remediation status, and/or rule versions associated with the data finding.

At S340, the generated remediation action is initiated in the computing environment where the specific data object is detected. In at least one embodiment, initiating the remediation action includes invoking one or more provider interfaces (e.g., cloud provider APIs) to apply configuration changes to the specific data object, to its containing location (e.g., bucket, prefix, database, schema), and/or to associated access control mechanisms. In at least one embodiment, remediation engine 115 records remediation execution status, outcomes, and/or timestamps in security database 120, thereby enabling tracking of remediation progress over time.

Although FIG. 3 shows example blocks of the method 300, in some implementations, process 300 may include additional blocks, fewer blocks, different blocks, or differently arranged blocks than those depicted in FIG. 3. Additionally, or alternatively, two or more of the blocks of process 300 may be performed in parallel. For example, remediation actions may be generated for multiple data objects associated with a given finding concurrently, or remediation actions may be staged such that a first action (e.g., tagging) precedes a second action (e.g., permission modification) based on policy constraints or approval workflows.

Figure 4:
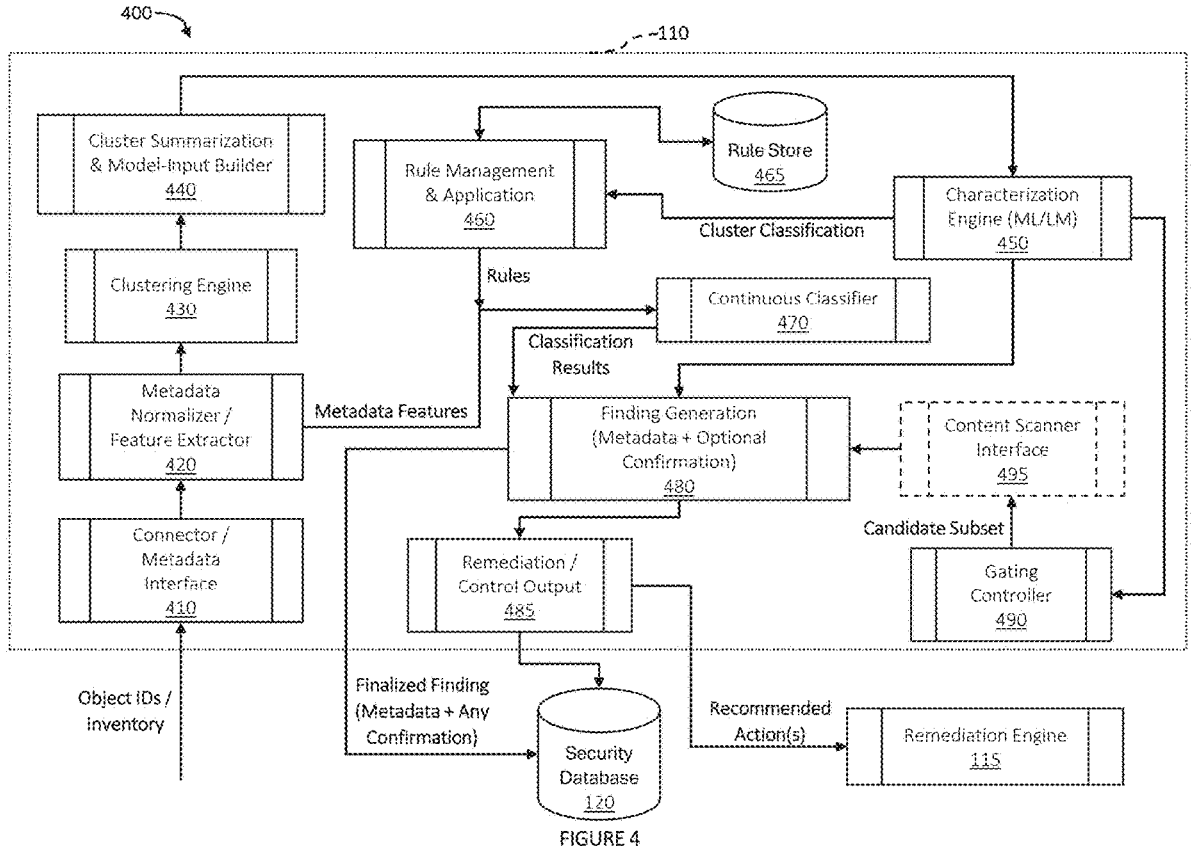
FIG. 4 illustrates an example functional diagram of a portion of the data security posture management (DSPM) system for clustering data objects based on metadata, char- acterizing data clusters using a machine learning model, generating and applying customer-specific classification rules, and generating data findings, according to at least one embodiment.

FIG. 4 illustrates an example functional diagram 400 of a portion of the data security posture management (DSPM) system 110 according to at least one embodiment. As shown in FIG. 4, system 110 may be decomposed into a plurality of logical subcomponents that cooperate to obtain metadata associated with detected objects, cluster the data objects based on metadata-derived similarity, characterize clusters using a machine learning model, generate and apply customer-specific classification rules, and generate data findings based on metadata with optional confirmation, thereby enabling environment-specific data detection without requiring payload content access, as described herein. In the illustrated embodiment, the logical subcomponents include connector/metadata interface 410, metadata normalizer/feature extractor 420, clustering engine 430, cluster summarization and model-input builder 440, characterization engine (machine learning [ML]/language model [LM]) 450, rule management and application 460, rule store 465, continuous classifier 470, finding generation (metadata+optional confirmation) 480, remediation/control output 485, gating controller 490, and content scanner interface 495. The components illustrated in FIG. 4 represent select functional modules of system 110 and their arrangement is provided for purposes of explanation rather than limitation.

In at least one embodiment, connector/metadata interface 410 is configured to obtain object identifiers and/or inventory information (e.g., object keys, URIs, table identifiers) for data objects stored in one or more data sources, and to obtain metadata for the data objects via one or more provider interfaces. Connector/metadata interface 410 may obtain metadata without obtaining payload content of the data objects. The metadata may include, by way of example and not limitation, object identifiers, names, file paths or object keys, hierarchical path segments, timestamps, size, storage properties, tags or labels, access control attributes, encryption indicators, versioning indicators, and/or other non-payload properties. In at least one embodiment, connector/metadata interface 410 provides the obtained metadata to downstream modules of system 110 for feature generation, clustering, classification, and/or rule application. In at least one embodiment, connector/metadata interface 410 includes (or is) one or more connector components and one or more analyzers configured to discover data objects in one or more data sources and to obtain metadata associated with the data objects via one or more provider interfaces without accessing payload content.

In at least one embodiment, metadata normalizer/feature extractor 420 is configured to transform raw metadata obtained by connector/metadata interface 410 into metadata features usable for similarity determination and classification. For example, metadata normalizer/feature extractor 420 may normalize field formats across heterogeneous sources, tokenize names and path segments, derive hierarchy/path features (e.g., prefix, depth, token frequency), and compute additional metadata-derived attributes (e.g., timestamp distributions, size bins, tag vectors, access-control similarity indicators). Metadata normalizer/feature extractor 420 outputs metadata features to a clustering engine 430 and, in at least one embodiment, provides metadata features to a continuous classifier 470 for rule application to additional data objects. In at least one embodiment, metadata normalizer/feature extractor 420 includes (or is) one or more feature generation components and one or more analyzers configured to normalize metadata across heterogeneous sources, tokenize names and path segments, and generate metadata-derived features, including hierarchy and path features.

In at least one embodiment, clustering engine 430 is configured to cluster data objects into data groupings based on similarity of metadata features. Clustering engine 430 may compute similarity using one or more signals derived from file paths or object keys, hierarchy relationships, tokenized names, timestamps, sizes, tags, and/or access-control attributes. In at least one embodiment, clustering engine 430 forms clusters corresponding to regions of a hierarchy (e.g., a bucket namespace or database namespace) such that data objects sharing path prefixes or other hierarchy features are assigned to a common cluster. Clustering engine 430 provides cluster assignments and/or cluster membership information to a cluster summarization and model-input builder 440. In at least one embodiment, clustering engine 430 includes (or is) one or more clustering components and one or more analyzers configured to compute similarity between data objects based on metadata-derived features and to assign data objects to data clusters based on similarity determination and thresholding.

In at least one embodiment, cluster summarization and model-input builder 440 is configured to generate, for a cluster, an aggregated representation derived from metadata associated with data objects in the cluster. The aggregated representation may include representative object identifiers, representative file paths or object keys, common token patterns, summary statistics of metadata fields, access-control patterns, and/or other cluster-level indicators. In at least one embodiment, cluster summarization and model-input builder 440 generates a prompt or other model input based on the aggregated representation and provides the prompt or other model input to characterization engine 450. In at least one embodiment, cluster summarization and model-input builder 440 includes (or is) one or more summarization components and one or more analyzers configured to generate aggregated cluster representations from metadata of cluster member data objects and to generate prompts or other model inputs based on the aggregated cluster representations.

In at least one embodiment, characterization engine (ML/LM) 450 is configured to generate a cluster classification for a cluster based on the aggregated cluster representation. In at least one embodiment, characterization engine 450 includes, or otherwise utilizes, a machine learning model (e.g., a language model, a large language model) to process the model input generated by cluster summarization and model-input builder 440, and to output a cluster classification. The cluster classification may indicate, for example, a data type, dataset purpose, sensitivity category, control category, and/or other characterization inferred from metadata and hierarchy signals. In at least one embodiment, characterization engine 450 outputs, in addition to a classification label, a confidence score and/or supporting attributes associated with the classification. The cluster classification is provided to rule management and application 460 and may additionally be provided to finding generation 480. In at least one embodiment, characterization engine 450 includes (or is) one or more model execution components and one or more analyzers configured to process prompts or other model inputs using a machine learning model, including a language model, to generate cluster classifications and associated confidence values and attributes.

In at least one embodiment, rule management and application 460 is configured to generate, manage, and apply customer-specific classification rules based on cluster classifications. In at least one embodiment, rule management and application 460 generates one or more rules configured to classify additional data objects based on metadata features without accessing payload content. The rules may include, by way of example and not limitation, path-based predicates, token-based predicates, metadata field predicates, and/or combinations thereof. In at least one embodiment, rule management and application 460 stores versioned rules in a rule store 465 and provides rules (including updates) to continuous classifier 470 for application to newly detected or additional data objects. In at least one embodiment, rule management and application 460 includes (or is) one or more rule management components and one or more analyzers configured to synthesize customer-specific classification rules from cluster classifications, manage rule lifecycle operations, and provide rule updates for application to additional data objects based on metadata.

In at least one embodiment, rule store 465 includes (or is) one or more storage components and one or more analyzers configured to store, version, and retrieve customer-specific classification rules and associated validation metrics for use in continuous classification. In at least one embodiment, rule store 465 is implemented as part of security database 120.

In at least one embodiment, continuous classifier 470 is configured to apply rules to metadata features associated with data objects. Continuous classifier 470 receives, as input, metadata features (e.g., from metadata normalizer/feature extractor 420) and rules (e.g., from rule management and application 460 and/or rule store 465), and outputs classification results for data objects and/or clusters. In at least one embodiment, continuous classifier 470 operates continuously or periodically to classify newly detected data objects, changed data objects, and/or previously unclassified data objects, thereby enabling ongoing enforcement and discovery as the customer environment 125 (FIG. 1) evolves. Continuous classifier 470 provides classification results to finding generation 480. In at least one embodiment, continuous classifier 470 includes (or is) one or more classification components and one or more analyzers configured to apply versioned rules to metadata-derived features of newly detected or changed data objects to generate classification results and confidence values without accessing payload content.

In at least one embodiment, finding generation (metadata+optional confirmation) 480 is configured to generate data findings based on metadata-derived outputs. Finding generation 480 may receive, as inputs, cluster classifications from characterization engine 450 and classification results from continuous classifier 470. Finding generation 480 generates a data finding that may include affected object identifiers, locations, a classification label, confidence information, and supporting metadata-derived evidence (e.g., representative paths). In at least one embodiment, finding generation 480 outputs a finalized finding to a security database 120 for storage, reporting, and/or downstream control selection. In at least one embodiment, finding generation 480 includes (or is) one or more finding generation components and one or more analyzers configured to generate data findings based on at least one of cluster classifications, rule-based classification results, and optional confirmation outputs, including associating findings with affected object identifiers and supporting metadata-derived evidence.

In at least one embodiment, system 110 supports optional confirmation of metadata-based findings using content scanning when permitted. In the illustrated embodiment 400, gating controller 490 is configured to select a candidate subset of data objects for optional content scanning based on metadata-derived outputs (e.g., classifications, classification results, confidence, and/or policy constraints). The gating controller 490 may output the candidate subset to content scanner interface 495. The content scanner interface 495 may perform pattern recognition or other payload-based inspection on the candidate subset when permitted and provide confirmation outputs to finding generation 480. In at least one embodiment, the confirmation outputs are used to refine a classification and/or adjust a confidence score, and the finalized finding stored in security database 120 reflects metadata-derived classification with optional confirmation. In at least one embodiment, gating controller 490 includes (or is) one or more selection components and one or more analyzers configured to select a candidate subset of data objects for optional content scanning based on metadata-derived outputs, confidence values, and policy constraints. In at least one embodiment, content scanner interface 495 includes (or is) one or more scanning components and one or more analyzers configured to perform payload-based inspection on the candidate subset using pattern recognition or other scanning techniques when permitted and to output confirmation signals usable to refine classifications and findings.

In at least one embodiment, system 110 provides remediation/control output 485 indicative of one or more recommended actions associated with a data finding. Remediation/control output 485 may be derived from the classification, confidence, and/or control mappings associated with a finding and may include recommended or executable actions, such as restricting access, applying encryption settings, tagging objects, quarantining objects, generating alerts, and/or initiating workflows. In at least one embodiment, remediation/control output 485 provides recommended action(s) to remediation engine 115 for initiation in the computing environment 125 (FIG. 1), and remediation outcomes may be recorded in security database 120. In at least one embodiment, remediation/control output 485 includes (or is) one or more control selection components and one or more analyzers configured to map data findings and classifications to one or more recommended actions, policies, or remediation workflows based on control mappings and policy constraints.

It will be appreciated that the functional arrangement illustrated in FIG. 4 is exemplary and that additional, fewer, or alternative functional engines or modules may be included within system 110 without departing from the scope of the disclosed embodiments herein. The illustrated connections may represent logical data flows rather than physical connections, and the described functionality may be distributed across multiple computing resources or combined into a single module, depending on implementation requirements.

It should be noted that system 110 and any of its modules 410, 420, 430, 440, 450, 460, 465, 470, 480, 485, 490, and 495 may be implemented as software, hardware, or a combination thereof. In at least one embodiment, system 110 may be realized as just-in-time compiled software code. As used herein, the term "software" refers to one or more sequences of instructions, logic, or routines, including, but not limited to, source code, object code, intermediate code, interpretable code, or executable code, that may be stored on a non-transitory computer-readable medium and executed by one or more processors. The software may be implemented using one or more machine learning frameworks, including, but not limited to, TensorFlow™, PyTorch™, ONNX™, or equivalent platforms. The software may be executed in virtualized environments, such as containers, virtual machines, or serverless architectures, or may be deployed via cloud infrastructure.

Figure 7:
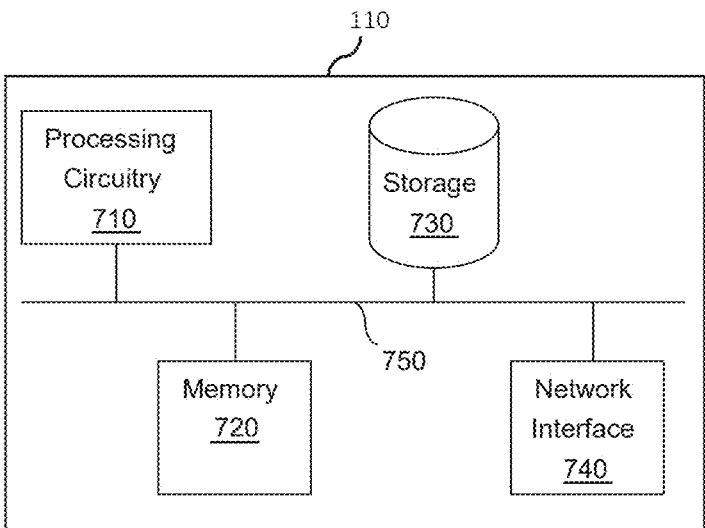
FIG. 7 illustrates an example block diagram of a computing architecture of a DSPM system, according to at least one embodiment.

In at least one embodiment, the system 110 is executed on a hardware layer (not shown in FIG. 4). The term "hardware" refers to one or more physical computing devices or components capable of performing operations, including model training, inference, and/or data processing. Non-limiting examples of hardware include central processing units (CPUs), graphics processing units (GPUs), tensor processing units (TPUs), application-specific integrated circuits (ASICs), field programmable gate arrays (FPGAs), neural processing units (NPUs), or equivalent dedicated AI accelerators, on-device microcontrollers, or edge processors capable of running trained models, and the like. The described embodiments are not limited to any particular implementation platform and may be deployed across heterogeneous environments comprising combinations of the above. An example hardware layer implementation of the system 110 in hardware is shown in FIG. 7.

Figure 5:
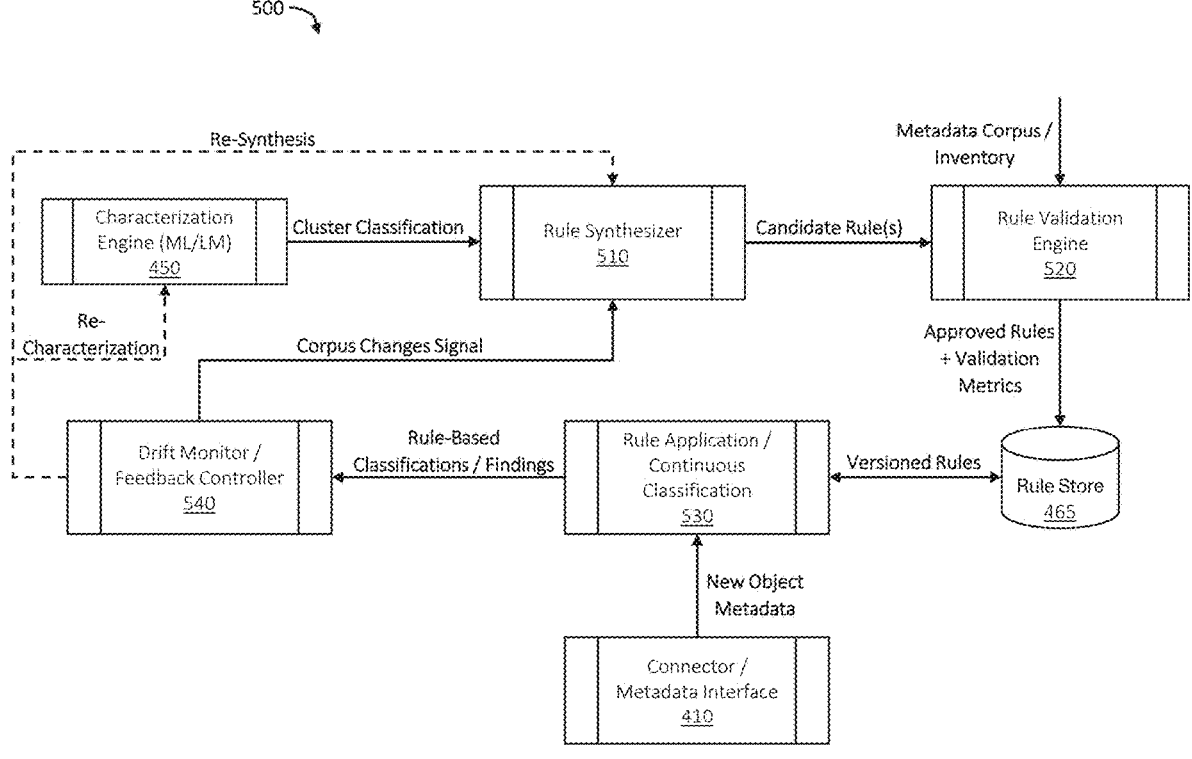
FIG. 5 illustrates an example rule generation, validation, versioning, and continuous application process for cus- tomer-specific classification rules based on metadata-de- rived cluster classifications, according to at least one embodiment.

FIG. 5 is an operational and functional diagram illustrating a method and/or process 500 for generating, validating, versioning, and continuously applying customer-specific classification rules based on metadata-derived cluster classifications, according to at least one embodiment. In at least one embodiment, process 500 may be performed by a system, such as the data security posture management (DSPM) system 110 shown in FIGS. 1 and 4, including one or more of characterization engine 450, rule management and application 460, rule store 465, continuous classifier 470, and/or other modules described herein. Process 500 is discussed with reference to the elements shown in FIGS. 1 and 4.

In at least one embodiment, the functional modules depicted in FIG. 5, including rule synthesizer 510, rule validation engine 520, rule application/continuous classification module 530, and drift monitor/feedback controller 540 are implemented as logical subcomponents of the DSPM system 110, and may be integrated with one or more modules of FIG. 4 (e.g., characterization engine 450, rule store 465, and connector/metadata interface 410). In other embodiments, one or more modules of 510, 520, 530, and 540 are implemented as separate services or distributed components communicatively coupled with system 110, without departing from the scope of the disclosed embodiments.

In at least one embodiment, process 500 begins when a characterization engine 450 generates a cluster classification for a data cluster based on aggregated metadata associated with data objects of the cluster. The cluster classification may include a classification label indicative of a data type, dataset purpose, sensitivity category, and/or control category, and may further include a confidence score and/or supporting attributes derived from metadata and hierarchy signals. The cluster classification is provided as an input to a rule synthesizer 510.

In at least one embodiment, rule synthesizer 510 generates one or more candidate rules based on the received cluster classification. The candidate rule(s) may be configured to classify additional data objects based on metadata without accessing payload content. By way of example and not limitation, the candidate rule(s) may include one or more path-based predicates (e.g., prefix patterns, wildcard patterns, token constraints), one or more metadata-field predicates (e.g., timestamp properties, size ranges, tags or labels, access control attributes, encryption indicators), and/or combinations thereof. In at least one embodiment, the candidate rule(s) include environment-specific predicates derived from metadata patterns observed in a customer environment 125 (FIG. 1), such that the candidate rule(s) are tailored to the customer's naming conventions, hierarchy structure, and/or storage organization. In at least one embodiment, rule synthesizer 510 includes (or is) one or more rule synthesis components and one or more analyzers configured to generate one or more candidate customer-specific classification rules from a cluster classification and associated metadata-derived attributes, the candidate rules being configured to classify data objects based on metadata without accessing payload content.

In at least one embodiment, the candidate rule(s) produced by rule synthesizer 510 are provided to a rule validation engine 520. Rule validation engine 520 is configured to evaluate the candidate rule(s) using a metadata corpus/inventory. The metadata corpus/inventory may include, for example, metadata records associated with data objects discovered in one or more data sources of the customer environment 125 and may be obtained or maintained without accessing payload content. In at least one embodiment, rule validation engine 520 determines validation metrics for the candidate rule(s), such as match counts, coverage across locations, sampled false positives, consistency across time windows, and/or other scoring outputs usable to approve, reject, or refine the candidate rule(s). In at least one embodiment, rule validation engine 520 includes (or is) one or more validation components and one or more analyzers configured to evaluate candidate rules against a metadata corpus or inventory, determine validation metrics, and generate an approved rule set based on the results of the evaluation.

In at least one embodiment, rule validation engine 520 outputs an approved rule set and validation metrics to rule store 465. Rule store 465 is configured to store versioned rules (e.g., rule versions associated with respective time periods, deployment states, and/or confidence levels) and to maintain associations between rule versions and one or more customer environments, accounts, projects, subscriptions, tenants, and/or data source scopes. In at least one embodiment, the validation metrics are stored with a corresponding rule version to enable auditing, explainability, and/or later refinement.

In at least one embodiment, rule application/continuous classification module 530 retrieves versioned rules from rule store 465 and applies the retrieved rule(s) to new object metadata received from a connector/metadata interface 410. The new object metadata may include metadata records associated with newly detected, newly created, newly modified, or previously unclassified data objects. The new object metadata may be obtained via inventory scans, event-driven updates, and/or delta queries against one or more provider interfaces, without accessing payload content. In at least one embodiment, rule application/continuous classification module 530 outputs rule-based classifications and/or findings for data objects, such as object-level labels, cluster-level labels, confidence values, and/or evidence derived from metadata. In at least one embodiment, rule application/continuous classification module 530 includes (or is) one or more rule application components and one or more analyzers configured to retrieve versioned rules from a rule store 465 and apply the versioned rules to metadata associated with newly detected or changed data objects to generate rule-based classifications and findings without accessing payload content.

In at least one embodiment, process 500 includes drift monitoring and feedback. Drift monitor/feedback controller 540 may receive rule-based classifications and/or findings from rule application/continuous classification module 530 and may determine whether one or more drift conditions are satisfied. Drift conditions may include, by way of example and not limitation, detection of new naming patterns, changes in hierarchy organization, changes in match distributions, reduced confidence, increased apparent false positives, changes in metadata field distributions (e.g., timestamps, sizes, access controls), and/or detection of new locations or data sources. In at least one embodiment, drift monitor/feedback controller 540 generates a corpus changes signal indicative of changes in the metadata corpus/inventory and provides the corpus changes signal to rule synthesizer 510 to trigger re-synthesis of one or more rules.

In at least one embodiment, drift monitor/feedback controller 540 additionally triggers re-characterization by providing a re-characterization signal to characterization engine 450. For example, when drift conditions are satisfied, characterization engine 450 may re-characterize one or more clusters based on updated aggregated metadata, thereby producing an updated cluster classification that may be used by rule synthesizer 510 to generate updated candidate rule(s). In at least one embodiment, the re-synthesis and/or re-characterization paths are performed periodically, in response to detected drift, and/or upon changes in customer policy constraints. In at least one embodiment, drift monitor/ feedback controller 540 includes (or is) one or more monitoring components and one or more analyzers configured to detect drift conditions based on changes in metadata distributions, cluster composition, and/or rule performance signals, and to generate re-characterization and re-synthesis signals that trigger updates to cluster characterization and rule generation.

It will be appreciated that the functional arrangement illustrated in FIG. 5 is exemplary and that process 500 may be implemented with additional, fewer, or alternative functional modules without departing from the scope of the disclosed embodiments herein. The illustrated connections may represent logical data flows rather than physical connections, and the described functionality may be distributed across multiple computing resources, combined into a single module, or separated into additional modules, depending on implementation requirements.

Figure 6:
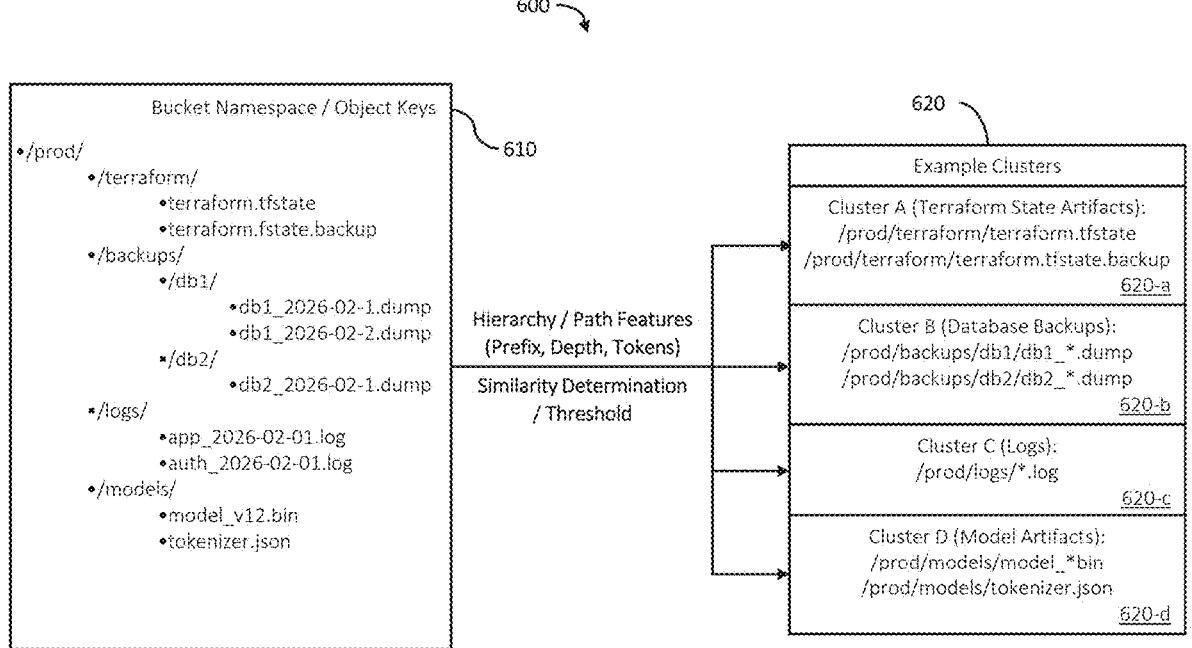
FIG. 6 illustrates an example of clustering data objects into data clusters based on hierarchy and path features of object keys and file paths, including similarity determination and thresholding, according to at least one embodiment.

FIG. 6 illustrates an example diagram 600 showing clustering of data objects into data clusters based on hierarchy and path features of object identifiers (e.g., bucket namespaces and object keys), according to at least one embodiment. In at least one embodiment, diagram 600 depicts an example of hierarchy-derived clustering that may be performed by data security posture management (DSPM) system 110, such as by metadata normalizer/feature extractor 420 and clustering engine 430 described with respect to FIG. 4, and corresponds to clustering operations described with respect to S230 of FIG. 2. Diagram 600 is provided for purposes of illustration and is not intended to limit the disclosed embodiments to the specific example object keys, naming conventions, or cluster labels shown therein.

In the illustrated embodiment 600, a bucket namespace/object keys representation 610 includes a plurality of object keys organized in a hierarchy. The hierarchy may correspond to a logical directory structure defined by delimiters in object keys (e.g., "/"), a prefix tree or trie representation of object keys, and/or other namespace structures that encode relationships among data objects. In at least one embodiment, system 110 derives hierarchy information for each data object by parsing an object key or file path into segments, determining a depth of the object within the hierarchy, and determining one or more tokens (e.g., path segments, filename substrings, extensions) associated with the object.

In at least one embodiment, system 110 generates hierarchy/path features for the data objects based on one or more of: (i) shared prefix length; (ii) common path segments; (iii) directory depth proximity; (iv) token overlap and/or token frequency; (v) naming convention indicators (e.g., "backup", "logs", "models"); and/or (vi) extension patterns (e.g., ".log", ".dump", ".bin", "json"). As illustrated in diagram 600, such hierarchy/path features may include prefix, depth, and tokens, and may be used as inputs to a similarity determination and/or thresholding operation that determines whether two or more data objects are sufficiently similar to be assigned to a common cluster. In at least one embodiment, the similarity determination is performed using a similarity score computed as a weighted combination of multiple hierarchy/path features, and clustering engine 430 assigns data objects to clusters based on one or more thresholds, linkage criteria, and/or neighborhood relationships.

In the illustrated embodiment 600, example clusters 620 represent output groupings produced by clustering based on the hierarchy/path features. Each cluster 620 may include a plurality of data objects that share one or more hierarchy characteristics, such as a common prefix region, a common intermediate directory, or similar filename token patterns. For example, cluster 620-*a* is illustrated as including Terraform state artifacts located under a common "/prod/terraform/" prefix, cluster 620-*b* is illustrated as including database backup artifacts located under a "/prod/backups/" prefix with per-database sub-prefixes, cluster 620-*c* is illustrated as including log artifacts under a "/prod/logs/" prefix, and cluster 620-*d* is illustrated as including model artifacts under a "/prod/models/" prefix. In at least one embodiment, the cluster labels shown in FIG. 6 are illustrative and may correspond to classifications generated using metadata-based characterization (e.g., characterization engine 450 [FIG. 4]), and are not required for clustering itself.

In at least one embodiment, the clusters 620 provide a basis for dataset-level characterization and environment-specific rule generation without accessing payload content. For example, once a set of data objects is assigned to a cluster, system 110 may generate an aggregated cluster representation (e.g., representative object keys, common tokens, and summary statistics) and may generate a cluster classification based on the aggregated representation. In at least one embodiment, system 110 generates one or more customer-specific classification rules from a cluster classification, such as rules expressed as path-based predicates or token constraints (e.g., prefix patterns and/or wildcard patterns), which may be applied to additional objects as the environment evolves.

Although FIG. 6 illustrates hierarchy-derived clustering using an example bucket namespace, it will be appreciated that similar techniques may be applied to other data sources, such as databases, file systems, backups, log stores, and object stores across multiple cloud providers. Additionally, the hierarchy and path features described herein may be combined with other metadata-derived features (e.g., timestamps, sizes, tags, and access control attributes) for similarity determination and clustering, and the illustrated grouping is provided for purposes of explanation rather than limitation.

FIG. 7 is an example block diagram of a computing architecture of the data security posture management (DSPM) system 110.

The DSPM system 110 includes a processing circuitry 710 coupled to a memory 720, a storage 730, and a network interface 740. In an embodiment, the components may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 710 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 710 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In embodiments that utilize language models (LMs) or otherwise perform operations that may require or be enhanced through the use of parallel processing, the processing circuitry 710 may include processors such as CPUs, GPUs, TPUs, or other specialized accelerators capable of supporting large-scale inference and training. The hardware resources may be deployed on-premises, in a cloud-computing environment, or in a hybrid configuration, and may include memory, storage, and networking components sufficient to support parallel execution, load balancing, and scalable processing of genAI workloads.

The memory 720 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 730.

In another embodiment, the memory 720 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 710 to perform the various processes described herein.

The storage 730 may be magnetic storage, optical storage, solid-state storage, or other non-transitory computer-readable storage media, and may be realized, for example, as flash memory or other memory technology, CD-ROM, Digital Versatile Disks (DVDs), hard disk drives, solid state drives (SSDs), or any other medium that may be used to store information. Storage 730 may include instructions (i.e., code) for executing the operations described herein, including, without limitation, detecting data objects in one or more cloud computing environments, obtaining and normalizing metadata associated with the data objects without accessing payload content, generating metadata-derived features, clustering data objects into data clusters based on similarity of metadata-derived features (including hierarchy/path features), generating cluster summaries and model inputs, characterizing clusters using a machine learning model (including a language model [LM]), generating customer-specific classification rules, validating and versioning rules, applying rules to classify newly detected data objects, generating data findings based on metadata with optional confirmation, and initiating or recommending remediation actions. Storage 730 may further store rule definitions, versioned rule sets, configuration data, policy mappings, clustering and classification outputs, findings (including timestamps and status), and/or intermediate and/or output data generated by the DSPM system 110.

The network interface 740 allows the DSPM system 110 to communicate over one or more networks, such as the Internet or a local area network (LAN). The network interface 740 communicates with these elements. The network interface 740 may further support communication with one or more data sources and cloud services in a customer computing environment (e.g., computing environment 125 [FIG. 1]) including, for example, object storage services (e.g., bucket 130 [FIG. 1]), databases (e.g., database 140 [FIG. 1]), inventory and catalog services, event notification services, and other provider APIs by which metadata may be obtained without obtaining payload content. The network interface 740 may further support communication with an inspection environment (e.g., inspection environment 105 [FIG. 1]), including security database 120 (FIG. 1) and remediation engine 115 (FIG. 1), and may support communication with external services, cloud-based platforms, and network-accessible APIs used for optional content scanning when permitted and/or for initiating remediation actions. In at least one embodiment, the network interface 740 supports wired and/or wireless communication protocols, including, without limitation, Ethernet, Wi-Fi, cellular, TCP/IP, HTTP/HTTPS, WebSocket, gRPC, and/or other suitable communication protocols, and may facilitate secure communication using authentication, encryption, and/or authorization mechanisms.

It should be understood that the embodiments described herein are not limited to the specific architecture illustrated in FIG. 7 and that other architectures may be equally used without departing from the scope of the disclosed embodiments.

It should be further noted that the DSPM system 110 may be realized using a computing architecture similar to the architecture illustrated in FIG. 7, but that other architectures may be equally used without departing from the scope of the disclosed embodiments. Further, the memory 720 may include instructions for executing the function of the respective device.

The various embodiments disclosed herein can be implemented as hardware, firmware, firmware executing on hardware, software, software executing on hardware, or any combination thereof. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C"

or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for classifying data objects for data security posture management (DSPM) in a cloud computing environment based on metadata, comprising:

detecting a plurality of data objects in one or more data sources of the cloud computing environment, wherein each data object in the plurality of data objects comprises metadata;

generating metadata-derived features from the metadata, wherein the metadata-derived features include hierarchy and path features derived from at least one of object keys and file paths;

clustering the plurality of data objects into a plurality of data clusters based on a similarity determination applied to the metadata-derived features;

generating, for a first data cluster of the plurality of data clusters, an aggregated cluster representation and a corresponding prompt based on metadata associated with data objects in the first data cluster;

generating a cluster classification for the first data cluster based on a result of processing the corresponding prompt with a language model; and generating one or more data findings based on at least one of the cluster classification and a plurality of classification results.

2. The method of claim 1, further comprising:

generating a recommended remediation action based on a data finding; and initiating the recommended remediation action in the cloud computing environment by invoking one or more provider interfaces.

3. The method of claim 2, wherein the invoked one or more provider interfaces modify at least one of access controls, encryption settings, tags, and storage configuration associated with a data object implicated by the data finding.

4. The method of claim 1, further comprising:

monitoring drift based on changes in at least one of metadata distributions, cluster composition, and rule-based match distributions; and responsive to detecting drift, triggering at least one of re-characterizing one or more clusters using the language model and re-synthesizing at least one customer-specific classification rule.

5. The method of claim 1, further comprising:

selecting, based on at least one of the cluster classification, a confidence score, and a policy constraint, a candidate subset of data objects for optional content scanning; and performing content scanning only on the selected candidate subset to generate confirmation outputs that refine at least one data finding.

6. The method of claim 1, wherein the metadata, for each data object in the plurality of data objects, is obtained via one or more provider interfaces that provide object properties without accessing payload content of the data object.

7. The method of claim 1, further comprising:

generating, based on the cluster classification, one or more customer-specific classification rules configured to classify additional data objects using the metadata without accessing payload content.

8. The method of claim 7, further comprising:

validating the one or more customer-specific classification rules against a metadata corpus or inventory; and storing versioned rules based on results of the validating.

9. The method of claim 8, further comprising:

applying at least one stored versioned rule to metadata-derived features of newly detected data objects to generate the plurality of classification results.

10. A system for classifying data objects for data security posture management (DSPM) in a cloud computing environment based on metadata comprising:

a processing circuitry:

a memory, the memory containing instructions that, when executed by the processing circuitry, configure the system to:

detect a plurality of data objects in one or more data sources of the cloud computing environment, wherein each data object in the plurality of data objects comprises metadata;

generate metadata-derived features from the metadata, wherein the metadata-derived features include hierarchy and path features derived from at least one of object keys and file paths;

cluster the plurality of data objects into a plurality of data clusters based on a similarity determination applied to the metadata-derived features;

generate, for a first data cluster of the plurality of data clusters, an aggregated cluster representation and a corresponding prompt based on metadata associated with data objects in the first data cluster;

generate a cluster classification for the first data cluster based on a result of processing the corresponding prompt with a language model; and generate one or more data findings based on at least one of the cluster classification and a plurality of classification results.

11. The system of claim 10, wherein the memory contains further instructions which when executed by the processing circuitry further configure the system to:

generate a recommended remediation action based on a data finding; and initiate the recommended remediation action in the cloud computing environment by invoking one or more provider interfaces.

12. The system of claim 11, wherein the invoked one or more provider interfaces modify at least one of access controls, encryption settings, tags, and storage configuration associated with a data object implicated by the data finding.

13. The system of claim 10, wherein the memory contains further instructions which when executed by the processing circuitry further configure the system to:

monitor drift based on changes in at least one of metadata distributions, cluster composition, and rule-based match distributions; and responsive to detecting drift, trigger at least one of re-
characterizing one or more clusters using the language
model and re-synthesizing at least one customer-spe-
cific classification rule.

14. The system of claim 10, wherein the memory contains
further instructions which when executed by the processing
circuitry further configure the system to:

select, based on at least one of the cluster classification, a
confidence score, and a policy constraint, a candidate
subset of data objects for optional content scanning;
and perform content scanning only on the selected candidate
subset to generate confirmation outputs that refine at
least one data finding.

15. The system of claim 10, wherein the metadata, for
each data object in the plurality of data objects, is obtained
via one or more provider interfaces that provide object
properties without accessing payload content of the data
object.

16. The system of claim 10, wherein the memory contains
further instructions which when executed by the processing
circuitry further configure the system to:

generate, based on the cluster classification, one or more
customer-specific classification rules configured to
classify additional data objects using the metadata
without accessing payload content.

17. The system of claim 16, wherein the memory contains
further instructions which when executed by the processing
circuitry further configure the system to:

validate the one or more customer-specific classification
rules against a metadata corpus or inventory; and store versioned rules based on results of the validating.

18. The system of claim 17, wherein the memory contains
further instructions which when executed by the processing
circuitry further configure the system to:

apply at least one stored versioned rule to metadata-
derived features of newly detected data objects to
generate the plurality of classification results.

19. A non-transitory computer-readable medium storing a
set of instructions for classifying data objects for data
security posture management (DSPM) in a cloud computing
environment based on metadata, the set of instructions
comprising:

one or more instructions that, when executed by one or
more processing circuitries of a device, cause the
device to:

detect a plurality of data objects in one or more data
sources of the cloud computing environment,
wherein each data object in the plurality of data
objects comprises metadata;

generate metadata-derived features from the metadata,
wherein the metadata-derived features include hier-
archy and path features derived from at least one of
object keys and file paths;

cluster the plurality of data objects into a plurality of
data clusters based on a similarity determination
applied to the metadata-derived features;

generate, for a first data cluster of the plurality of data
clusters, an aggregated cluster representation and a
corresponding prompt based on metadata associated
with data objects in the first data cluster;

generate a cluster classification for the first data cluster
based on a result of processing the corresponding
prompt with a language model; and generate one or more data findings based on at least one
of the cluster classification and a plurality of classi-
fication results.

* * * * *